United States Patent [19]
Yoshida

[11] Patent Number: 5,438,427
[45] Date of Patent: Aug. 1, 1995

[54] FACSIMILE APPARATUS WITH CONTROLLED IMAGE PAGE TRANSMISSION AFTER RETRANSMISSION

[75] Inventor: Takehiro Yoshida, Tokyo, Japan

[73] Assignee: Canon Kabushiki Kaisha, Tokyo, Japan

[21] Appl. No.: 325,639

[22] Filed: Oct. 19, 1994

Related U.S. Application Data

[63] Continuation of Ser. No. 771,183, Oct. 4, 1991, abandoned.

[30] Foreign Application Priority Data

Oct. 11, 1990 [JP] Japan .................. 2-273588

[51] Int. Cl.⁶ .................. H04N 1/333; H04N 1/41; H04N 1/415
[52] U.S. Cl. .................. 358/405; 358/426; 358/261.2; 358/261.3; 358/430; 358/432; 358/439
[58] Field of Search .................. 358/405, 406, 426, 430, 358/432, 261.2, 261.3, 439, 434, 435, 437; 371/32, 31

[56] References Cited

U.S. PATENT DOCUMENTS

| | | | |
|---|---|---|---|
| 4,656,523 | 4/1987 | Mizutani | 358/432 |
| 4,799,110 | 1/1989 | Hisada et al. | 358/261.3 |
| 4,887,162 | 12/1989 | Arai | 358/434 |
| 5,031,179 | 7/1991 | Yoshida et al. | 371/32 |
| 5,121,221 | 6/1992 | Hamano et al. | 358/426 |

OTHER PUBLICATIONS

Patent Abstracts Japan vol. 13, No. 574, Dec. 19, 1989 (JP 1240077).
Patent Abstracts Japan vol. 14, No. 328, Jul. 3, 1990 (JP 2111164).
Patent Abstracts Japan vol. 13, No. 371, Aug. 17, 1989 (JP 1125035).
Patent Abstracts Japan vol. 13, No. 371, Aug. 17, 1989 (JP 1125056).
Patent Abstracts Japan vol. 13, No. 378, Aug. 22, 1989 (JP 1137736).
Patent Abstracts Japan vol. 13, No. 390, Aug. 29, 1989 (JP 1128663).
Patent Abstracts Japan vol. 13, No. 396, Sep. 4, 1989 (JP 1141431).
Patent Abstracts Japan vol. 13, No. 396, Sep. 4, 1989 (JP 1141433).
Patent Abstracts Japan vol. 13, No. 396, Sep. 4, 1989 (JP 1141434).

*Primary Examiner*—Scott A. Rogers
*Attorney, Agent, or Firm*—Fitzpatrick, Cella, Harper & Scinto

[57] ABSTRACT

A facsimile apparatus for communicating image data by an error retransmission communication comprises means for setting to proceed to the transmission of the next data when data is not correctly transmitted by the retransmission of error data a predetermined number of times, and means for controlling the transmission of the next data in accordance with an encoding system of the image data.

24 Claims, 7 Drawing Sheets

FACSIMILE APPARATUS WITH CONTROLLED IMAGE PAGE TRANSMISSION AFTER RETRANSMISSION

This application is a continuation of application Ser. No. 07/771,183 filed Oct. 4, 1991, now abandoned.

BACKGROUND OF THE INVENTION

1. Field of the Invention

The present invention relates to a facsimile apparatus, and more particularly to a facsimile apparatus having an error resend mode.

2. Related Background Art

As a facsimile apparatus having an error resend mode, a facsimile apparatus having an error correction mode (ECM) by a half-duplex communication by the CCITT Recommendation has been known. In a normal telephone line, a probability of occurrence of a transmission error is high and a portion of the image information is lost by the transmission error, but an image may be received without transmission error by transmitting the image by the ECM communication.

In the prior art G3 standard facsimile apparatus, the Modified Huffmann (MH) encoding system or the Modified Read (MR) encoding system has been adopted in order to reduce an affect by the effect of transmission error. However, in the ECM communication, a two-dimensional compression encoding system having a higher compression factor than that of the MH or MR encoding system, for example, the Modified Modified Read (MMR) encoding system, may be adopted in order to reduce the amount of image information to be transmitted to improve a transmission efficiency.

In the ECM communication, the image information which included a transmission error is resent. However, depending on a line condition, a normal image (error-free image) may not be obtained even if the error portion is repeatedly resent. If the MMR code is adopted, the information following the error portion on the page is regarded as an error and it is lost when the error portion is left.

Accordingly, when the ECM communication is effected with the MMR code, the communication is effected in vain when the error portion is left on the page and the rest of the page is sent by the ECM communication.

Patents and patent applications relating to the error resend include U.S. Pat. No. 4,829,524, U.S. Pat. No. 4,885,755, Ser. No. 352,830 (filed on May 16, 1989), Ser. No. 267,541 (filed on Nov. 4, 1988), Ser. No. 337,152 (filed on Apr. 12, 1989) and Ser. No. 371,847 (filed on Jun. 27, 1989), but none of them proposes a solution to the above-mentioned problems.

SUMMARY OF THE INVENTION

It is an object of the present invention to improve a facsimile apparatus in the light of the above problems.

It is another object of the present invention to provide a facsimile apparatus which prevents wasteful communication in an error resend mode to attain efficient image transmission.

It is still another object of the present invention to prevent wasteful communication by controlling the transmission of the next image data in accordance with an image data encoding system when an error remains in spite of the error data resent in the error resend communication mode.

It is still another object of the present invention to prevent wasteful communication by controlling the transmission of the next image data in accordance with the image data encoding system and whether the image data having a remaining error therein is a physical page or not when an error remains in spite of the resend of the error data in the error resend communication mode.

Other objects of the present invention will be apparent from the following detailed description of the embodiments and the drawings.

DETAILED DESCRIPTION OF THE PREFERRED EMBODIMENTS

One embodiment of the present invention will be explained in detail with reference to the drawings.

In the following embodiment, a facsimile apparatus with an ECM communication facility is explained, although the present invention is not limited to the ECM but is applicable to various resend communication methods such as full-duplex resend communication.

Figure 1:
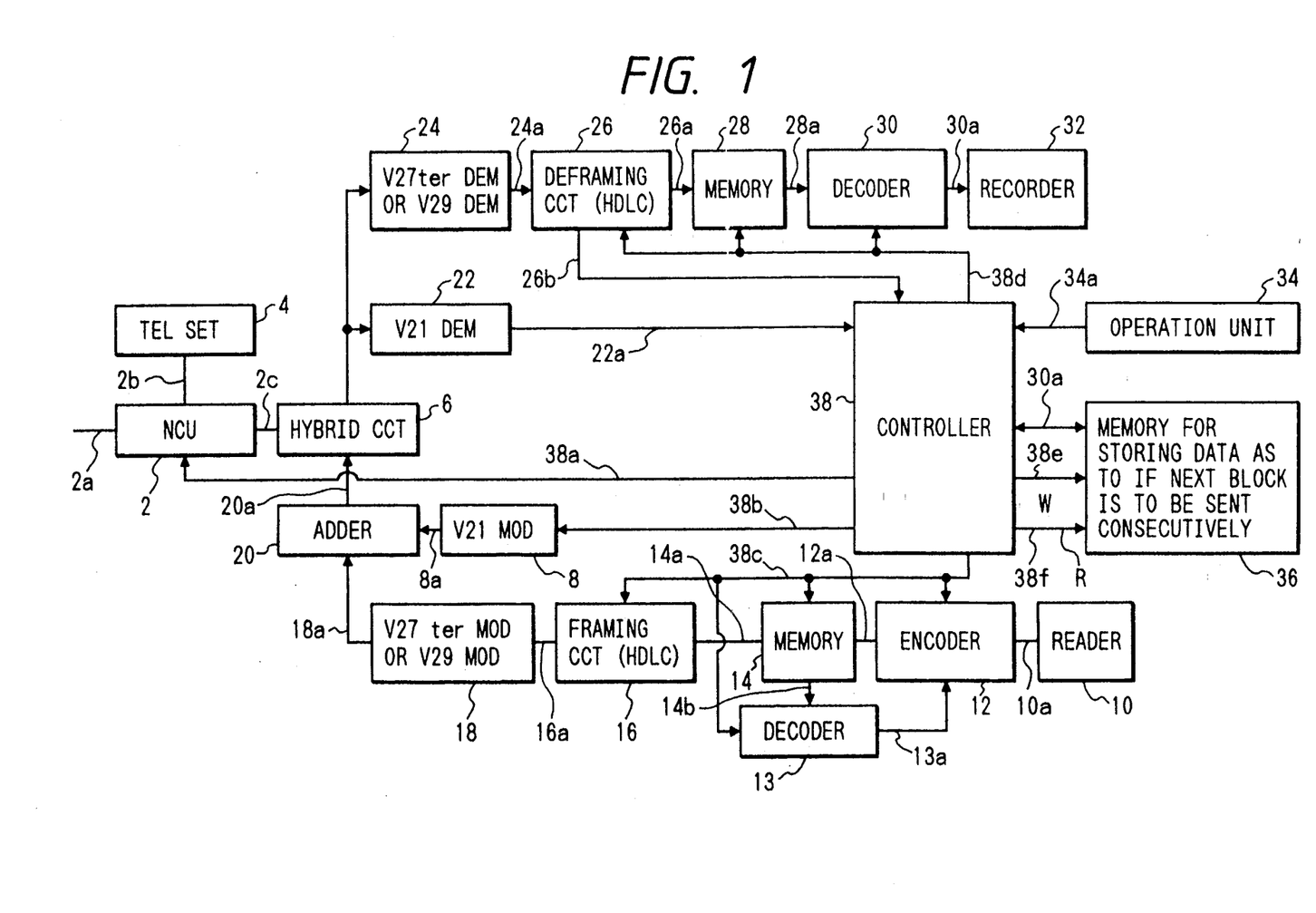
FIG. 1 shows a block diagram of a configuration of one embodiment of a facsimile apparatus of the present invention.

FIG. 1 shows a block diagram of a configuration of one embodiment of the facsimile apparatus of the present invention.

In FIG. 1, numeral 2 denotes a network control unit (NCU) connected to an end of a line for controlling the connection of a telephone switching network, switching a data communication line and maintaining a loop in order to permit the use of a telephone network for the data communication, and numeral 2a denotes a telephone line. The NCU 2 receives a signal from a signal line 38a, and if the signal level is "0", it connects the telephone line to a telephone set, that is, it connects the signal line 2a to a signal line 2b. If the signal level on the signal line 38a is "1", it connects the telephone line to a facsimile apparatus, that is, it connects the signal line 2a to a signal line 2c. In a normal state, the telephone line is connected to the telephone set.

Numeral 4 denotes a telephone set.

Numeral 6 denotes a hybrid circuit which isolates a transmission signal from a reception signal. The transmission signal on a signal line 20a is sent to the telephone line through the signal line 2c and the NCU 2. A signal sent from other station is supplied to a signal line 6a through the NCU 2 and the signal line 2c.

Numeral 8 denotes a modulator for modulation in accordance with the CCITT Recommendation V21. The modulator 8 receives a protocol signal on a signal line 38b, modulates the data and sends the modulated data to a signal line 8a.

Numeral 10 denotes a reader which sequentially reads one line of image signals along a main scan line at a time from a transmission document to produce a signal train representing block and white binary values. The black and white binary signal train formed by an imaging device such as a charge coupled device (CCD) and an optical system is supplied to a signal line 10a.

Numeral 12 denotes an encoder which receives read data on the signal line 10a and supplies encoded data (MH (modified Huffmann)-encoded, MR (Modified Read)-encoded, or MMR (Modified Modified Read)-encoded data) to a signal line 12a. The data is sequentially processed by a pointer supplied to a signal line 38c.

Numeral 13 denotes a decoder which receives the encoded data on a signal line 14b, decodes the encoded data to produce one line of raw data, which is supplied to a signal line 13a. The decoder 13 sequentially processes the data by a pointer supplied to a signal line 38c.

Numeral 14 denotes a memory for storing data supplied to the signal line 12a. At least one block of memory is required to resend an error frame. The data is sequentially processed by the pointer supplied to the signal line 38c.

Numeral 16 denotes a framing circuit which adds an address field, a control field and a frame number to the data supplied to the signal line 14a to frame the data as HDLC frame data. The framing circuit 16 sequentially processes the data by the pointer supplied to the signal line 38c.

Numeral 18 denotes a modulator which modulates data in accordance with the CCITT Recommendation V27 ter (differential phase modulation) or V29 (quadrature modulation). The modulator 18 receives the signal on the signal line 16a, modulates it and supplies the modulated data to a signal line 18a.

Numeral 20 denotes an adder which receives the signals on the signal lines 8a and 18a and supplies the sum to a signal line 20a.

Numeral 22 denotes a demodulator which demodulate the signal in accordance with the CCITT Recommendation V21. The demodulator 22 receives the signal on the signal line 6a, demodulates it on the basis of V21 and supplies the demodulated data to a signal line 22a.

Numeral 24 denotes a demodulator which demodulates the signal in accordance with the CCITT Recommendation V27 ter (differential phase modulation) or V29 (quadrature modulation). The demodulator 24 receives the signal on the signal line 6a, demodulates it and supplies the demodulated data to a signal line 24a.

Numeral 26 denotes a deframing circuit which deframes the framed data on the signal line 24a. The deframed data is supplied to a signal line 26a and to a status signal line 26b such as CRT status, end of one-frame reception or abort detection. The deframing circuit 26 sequentially processes the data by a pointer supplied to a signal line 38d.

Numeral 28 denotes a memory which stores the deframed data on the signal line 26a. The input to the memory and the output of the stored data to the signal line 28a are sequentially controlled by a pointer supplied to a signal line 38d.

Numeral 30 denotes a decoder which receives the signal on the signal line 28a, decodes it (MH (Modified Huffmann)-decodes, MR (Modified Read)-decodes, or MMR (Modified Modified Read)-decodes) and supplies the decoded data to a signal line 30a. The decoder 30 sequentially processes the data by a pointer supplied to a signal line 38d.

Numeral 32 denotes a record circuit which receives the decoded data on the signal line 30a and sequentially records it one line at a time.

Numeral 34 denotes a console unit. Key information from a ten-key, one-touch keys, abbreviated dialing keys, a start key and a next block transmission registration key is supplied to a signal line 34a.

Numeral 36 denotes a circuit which registers continuation or discontinuation of the transmission of the next partial page (a virtual page on the memory) when the error resend of the block of the partial page is given up. When the data is stored in the circuit 36, "0" (discontinue) or "1" (continue) is provided onto a signal line 36a and then a write pulse is provided onto a signal line 38e. When the stored data is read to the control circuit, a read pulse is provided onto a signal line 38f so that the stored data is supplied to the signal line 36a.

Numeral 38 denotes a control circuit which conducts the following major controls and comprises a microcomputer, a ROM, a RAM, etc. In the ECM communication, even when the error resend for the block of the partial page is given up (specifically, when PPR (partial page request) is received four times and EOR (end of retransmission)-Q. (EOP, MPS, EOM or NULL) is sent), the transmission of the next partial page is to be continued in the following case: (1) a mode to continue the transmission of the next partial page has been set (forced execution mode), (2) the encoding is done in the MH mode or the MR mode or (3) the block for which the error resend was given up is a partial page corresponding to the same page of the physical page (actual physical page) in the MMR mode. When the block for which the error resend was given up is the partial page corresponding to the same page of the physical page in the MMR mode, the transmission of the partial page on the next page to the physical page is interrupted and the transmission of the next physical page is started. In a mode which does not continue the transmission of the next partial page, the transmission of the next partial page is interrupted to terminate the communication without regard to the encoding mode if an error block (the block for which the resend is given up) is detected.

Figures 2A, 2A:
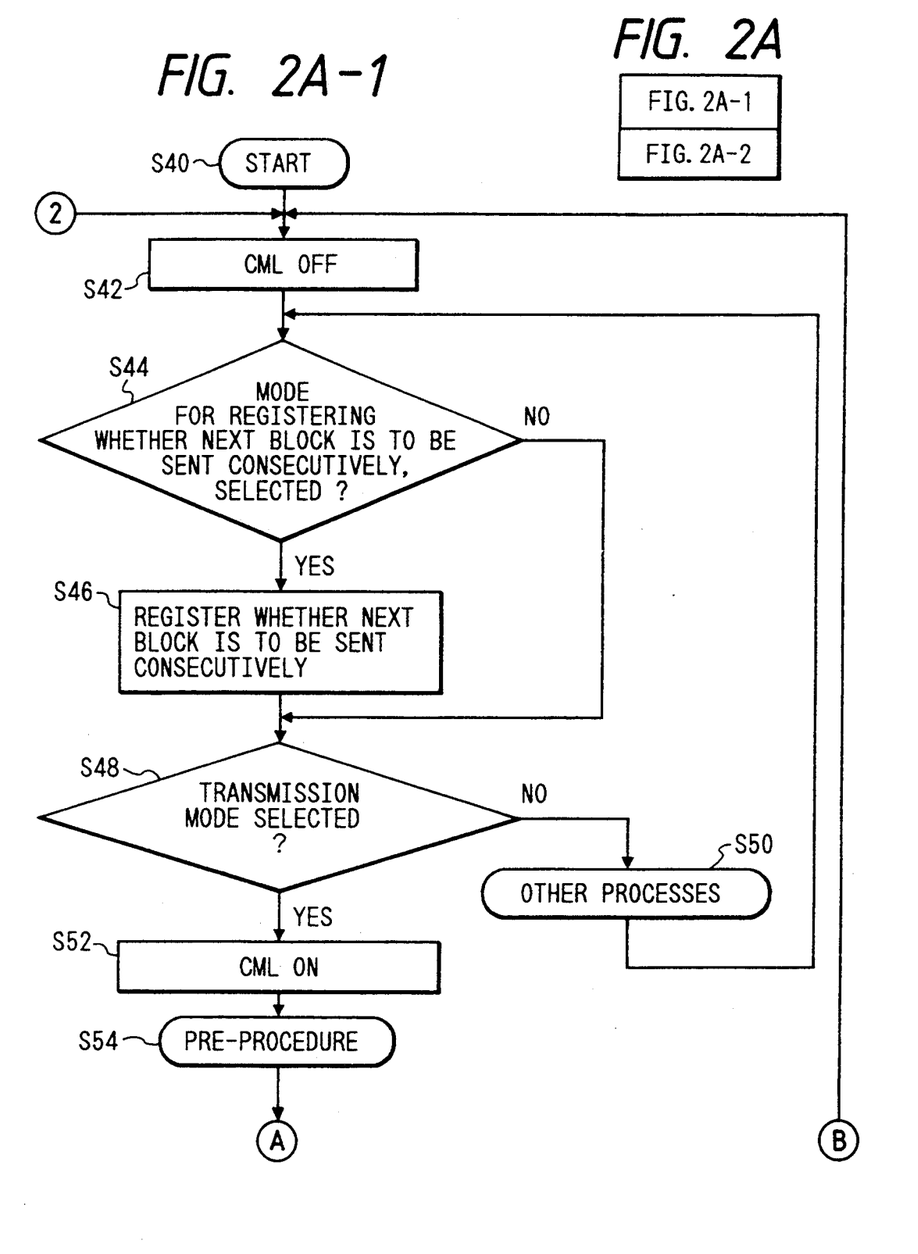
FIGS. 2A and 2B show a flow chart of a control operation of a control circuit 38 in the embodiment.
Figure 2A:
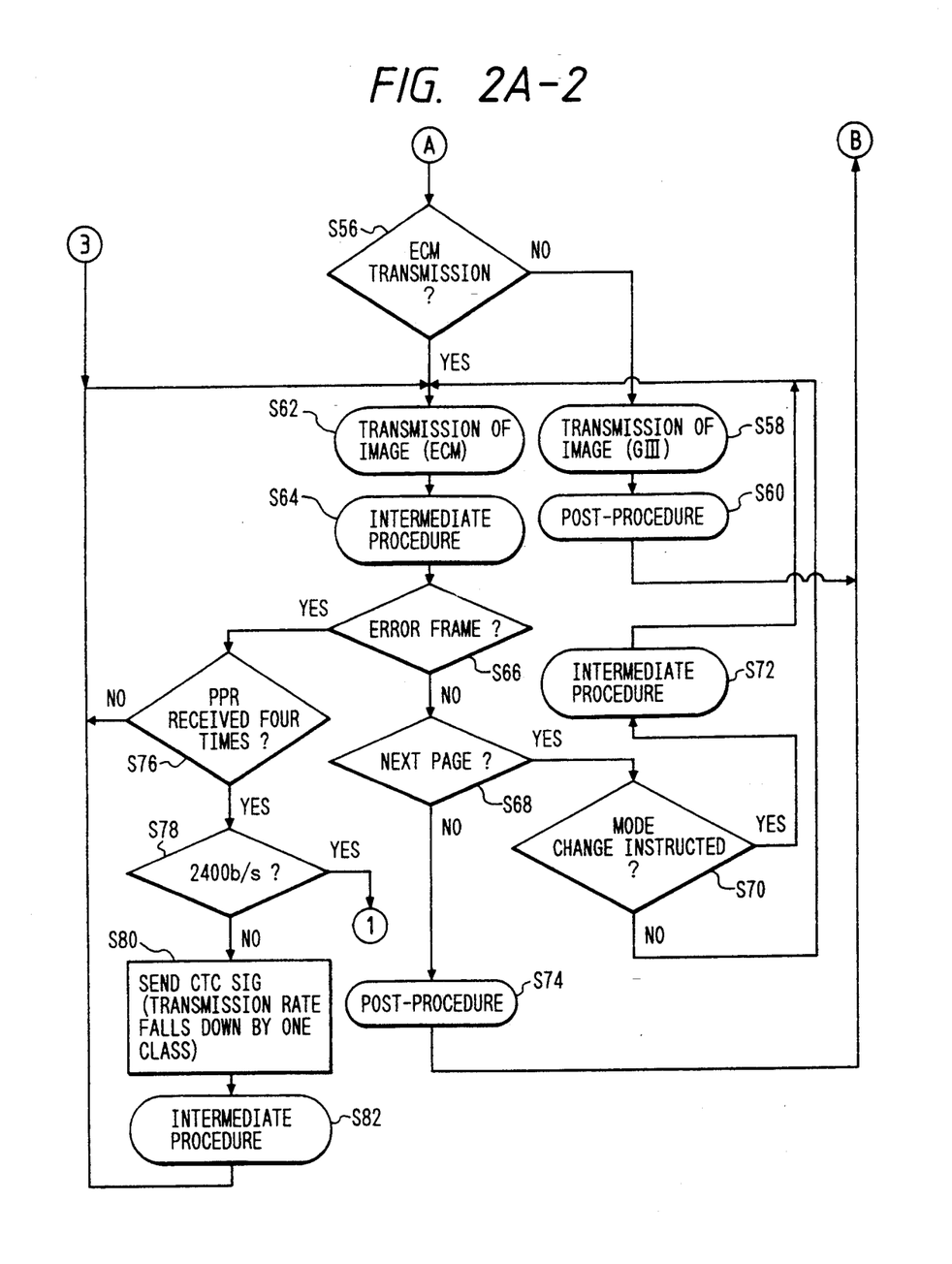
Figure 2B:
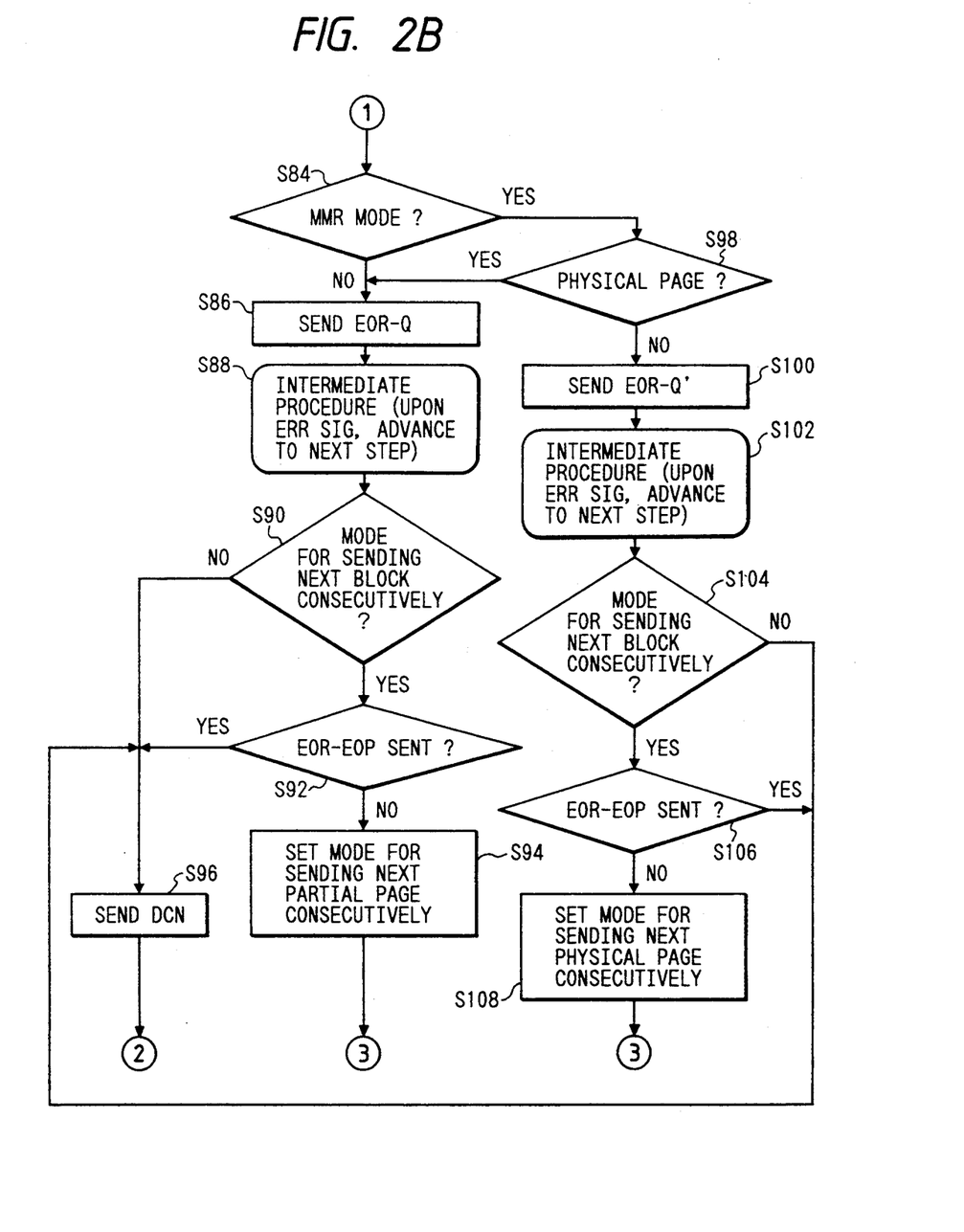

FIGS. 2A and 2B show a flow chart of a control operation of the control circuit 38 of the present embodiment.

In a step S42, a signal of a signal level "0" is supplied to the signal line 38a to turn off the CML and connect the line 2a to the telephone set 4. In a step S44, whether the registration mode for the continuation/discontinuation of the next partial page when the block error resend of the partial page is given up in the ECM communication has been selected or not is determined. If the registration mode has been selected, the continuation/discontinuation of the transmission of the next partial page when the block error resend of the partial page is given up is registered in accordance with a key entry from an operator in a step S46. If the registration mode has not been selected, the process proceeds to a step S48 to determine if the transmission has been selected or not. If the transmission has been selected, the process proceeds to a step S52, and if the transmission has not been selected, another step (step S50) is executed.

When the transmission has been selected and the process proceeds from the step S48 to the step S52, a signal of a signal level "1" is supplied to the signal line 38a to turn on the CML and connect the line 2a to the facsimile apparatus. In a step S54, a pre-protocol (pre-procedure) in a facsimile communication protocol is executed to establish a communication link with a destination station. In a step S56, whether the ECM communication mode or the normal G3 communication mode is to be selected is determined. (If the destination station has an ECM communication facility, the ECM communication mode is selected. The selection may be made manually.) If the normal G3 communication mode is selected, the process proceeds from the step S56 to a step S58, and if the ECM communication mode is selected, the process proceeds from the step S56 to a step S62.

In the step S58, the image transmission in the normal G3 mode is effected and when the transmission of the image information is completed, a post-protocol (post-procedure) of the facsimile communication protocol is executed in a step S60. Then, the process returns to the step S42.

When the process proceeds from the step S56 to the step S62, the image transmission in the ECM mode is effected and one partial page block (for example, 64 Kbytes) of image information is transmitted. The HDLC framed image data is transmitted and also retransmitted.

In a step S64, an intermediate protocol is executed and PPS (partial page signal)-Q (EOP, MPS, EOM or NULL) which indicates the end of partial page is sent. A protocol signal from the destination station is received. In a step S66, a retransmission command from the destination station is checked, and if it is detected (specifically, if PPR is received), the process proceeds to a step S76 to determine whether the PPR has been received four times. If the PPR has not been received four times, the process returns to the step S62 to retransmit the error frame designated by the PPR. If the retransmission command from the destination station is not detected in the step S66, or more particularly if MCF is received, the process proceeds to a step S68 to determine if the next page is present or not. If the next page is present, a mode change command is checked in a step S70. If the mode change command is not detected, the next page (partial page) is transmitted in the step S62. If the mode change command is detected in the step S70, a procedure for the mode change is executed in a step S72 and the transmission of the next page is conducted in the step S62.

If the next page is not present (all pages have been transmitted) in the step S68, the post-protocol is executed in a step S74 and the process returns to the step S42.

If it is determined in the step S76 that the PPR has been received four times at the same transmission rate (image information transmission rate), whether the transmission rate is a lowest rate (2400 bps) or not is determined in a step S78. If it is the lowest rate, the EOR-Q signal is sent to give up the block error resend of the partial page under transmission and the process proceeds to a step S84 to start the transmission of the subsequent partial pages. When the PPR is received and the current transmission rate is other than 2400 bps, a CTC (continue to connect) signal of a stepped-down transmission rate (9600 bps→7200 bps→4800 bps→2400 bps) is sent. In a step S82, an intermediate protocol to transmit at the stepped-down rate is executed, and in the step S62, the block error resend of the partial page under transmission is continued.

When the process proceeds from the step S78 to the step S84, whether the encoding of the image data for which the retransmission was given up is in the MMR mode or not is determined. If it is in the MMR mode, the process proceeds to a step S98 to determine whether the partial page block for which the retransmission was given up is a physical page or not. If it is a physical page, the process proceeds to a step S86. If it is not in the MMR mode in the step S84, the process proceeds to a step S86.

In the step S86, EOR-Q (EOP, EOM, MPS or NULL) is sent, and in a step S88, an intermediate protocol is executed. Specifically, ERR (Response for End of Retransmission) signal is received.

In a step S90, whether the mode to continue the transmission of the next partial page when the block error resend of the partial page is given up has been set or not is determined. If the mode to transmit the next block (forced mode) has been set, the process proceeds to a step S92, and if a mode not to transmit the next block has been set, a DCN (disconnect) signal for releasing the line is sent in a step S96 and the process returns to the step S42.

When the process proceeds from the step S90 to the step S92, whether the EOR-EOP signal has been sent, that is, whether the currently transmitted page information is for the last page or not is determined. When the EOR-EOP signal has been sent, that is, when the currently transmitted page information is for the last page, the process proceeds to a step S96 to send the DCN signal, and if the EOR-EOP signal has not been sent, that is, if the currently transmitted page information is not for the last page, the mode to continue the transmission of the next partial page is set in a step S94, and the process proceeds to the step S62. Namely, when the EOR-NULL is sent, the partial page of the same physical page information is transmitted, and when the EOR-MPS or the EOR-EOM is sent, the next physical page is transmitted.

In the step S98, if the partial page currently transmitted is a partial page which is not a boundary of the physical page, the process proceeds to a step S100. In the step S100, the next partial page which is not the boundary of the physical page is not transmitted and EOR-Q' (MPS, EOM or EOP) is sent. It is noticed that Q' does not include NULL (which indicates a partial page which is not a physical page).

In a step S102, an intermediate protocol is executed. Specifically, the EPR signal is received.

In a step S104, whether the mode is to continue the transmission of the next partial page or not when the block error resend of the partial page is given up is determined, and if the mode is not to transmit the next block, the process proceeds to a step S96. If the mode is to transmit the next block, the process proceeds to a step S106 to determine whether the EOR-EOP signal has been sent, that is, whether the currently transmitted page information is for the last page or not. If the EOR-EOP signal has been sent, that is, if the currently transmitted page information is for the last page, the process proceeds to a step S96. If the EOR-EOP signal has not been sent, that is, if the currently transmitted page information is not for the last page, the process proceeds to a step S108 to set a mode to continue the transmission of the next physical page. Namely, even if the transmission information when the PPR was received four times is not a boundary of a physical page, the next physical page rather than the partial page of the same physical page information is transmitted.

In the ECR, the transmission of the block of the next partial page of the same physical page may always be interrupted when the block error resend of the partial page which is not the physical page is given up in not only the MMR mode but also the MH or MR mode.

In the present embodiment, if an error block remains in the transmission of the MMR-encoded data in the ECM communication, the wasteful transmission is prevented. The present invention is not limited to the MMR code but it is equally applicable to an encoding system which imparts a great effect to a received image when a transmission error in a two-dimensional compression encoding or prediction encoding is included, such as the Read system.

In the present embodiment, if an error frame remains in a block of a partial page which is not consistent with the physical page in the transmission of the MMR data in the ECM communication, the transmission of the block of the next partial page of the same physical page is interrupted and the data of the next physical page is transmitted. However, instead of interrupting the transmission of the block of the next partial page when the error frame remains, the MMR data in the first one line of the block of the next partial page may be forcibly rendered all-white line and the block of the partial page which is MMR-reencoded with reference to the all-white line may be transmitted. In this case, steps S99-1 and S99-2 shown in FIG. 3 are added between the steps S98 and S100 of FIG. 2.

Figure 3:
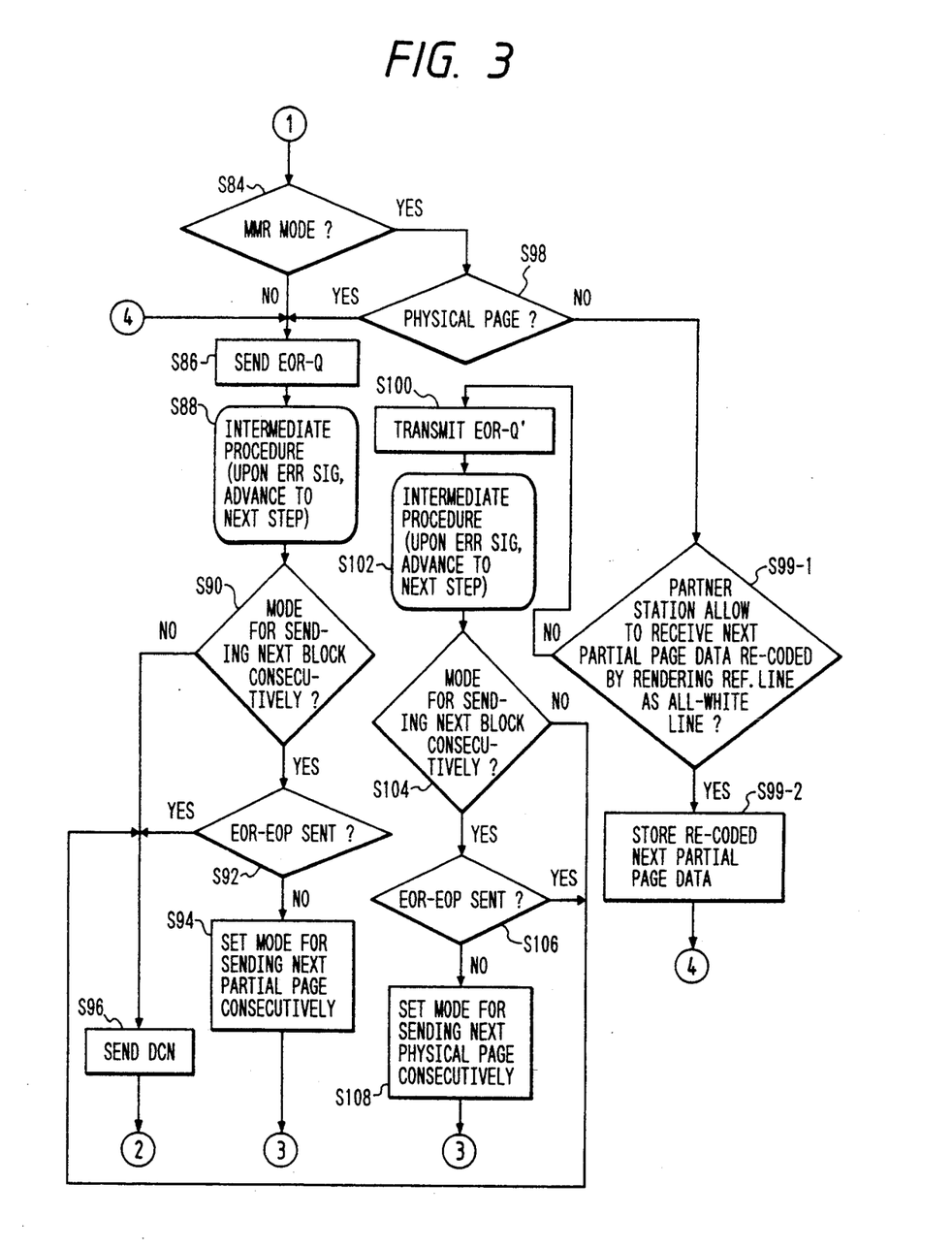
FIG. 3 shows a flow chart of a control operation in another embodiment.

In FIG. 3, when the process proceeds from the step S98 to the step S99-1, whether the destination station can receive the data generated by encoding the first encoded line of the next partial page of the same physical page with reference to the all-white line or not is determined. The decision is made based on the function information received from the destination station in the pre-protocol in the step S54 of FIG. 2. If the destination station is unable to receive it, the process proceeds from the step S99-1 to the step S100 in which the next partial page is not transmitted but the next physical page is transmitted. If the destination station is able to receive it, the process proceeds from the step S99-1 to the step S99-2 where the data of the next partial page is read from the memory 14 and decoded by the decoder 13, and the first reference line is rendered all-white line and the data is MMR-reencoded by the encoder 12. The reencoded data of the next partial page is stored in the memory 14, and the process proceeds to the step S86 to transmit the data of the next partial page.

Figure 4A:
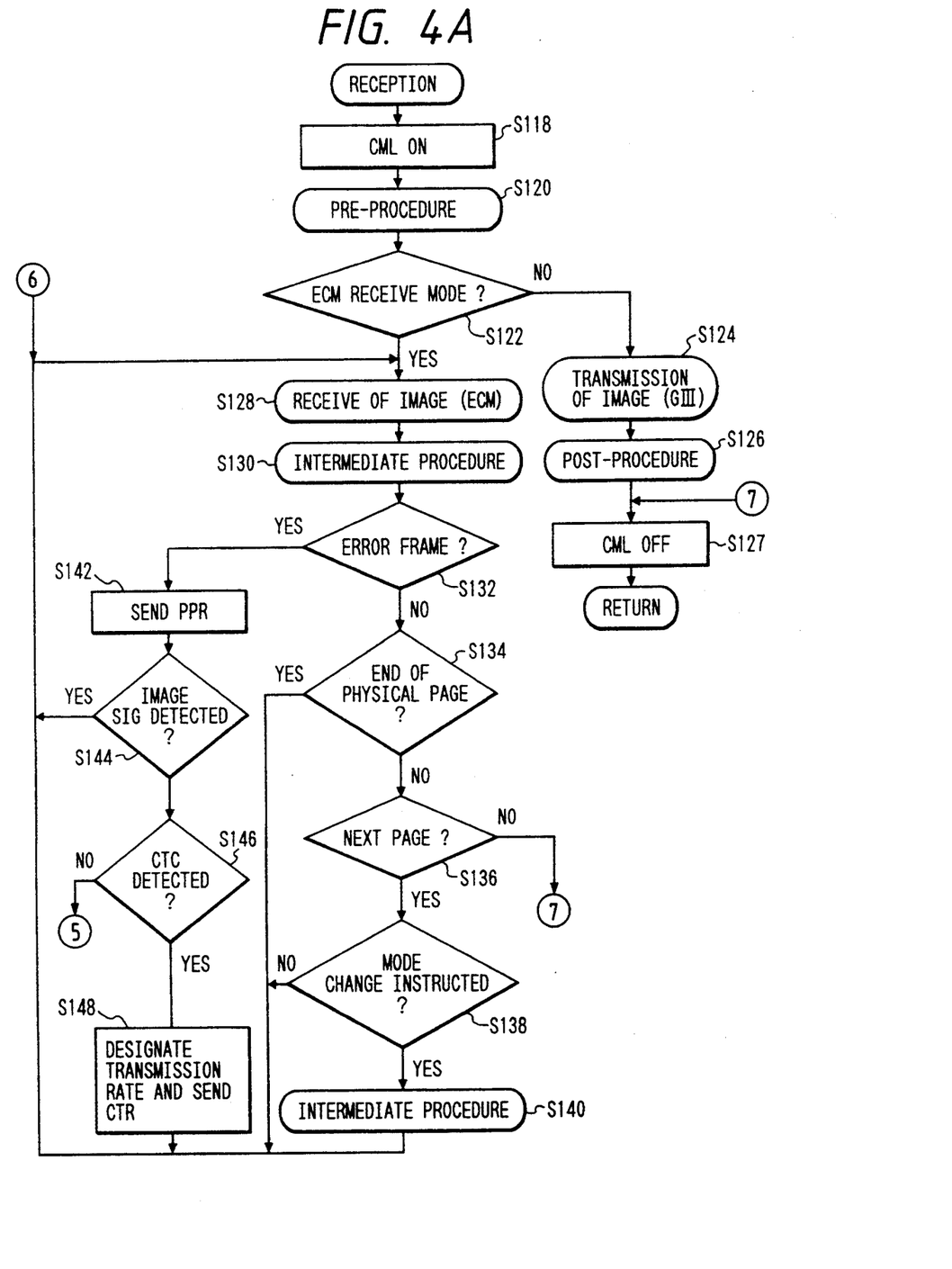
FIGS. 4A and 4B show a flow chart of a receiving routine.
Figure 4B:
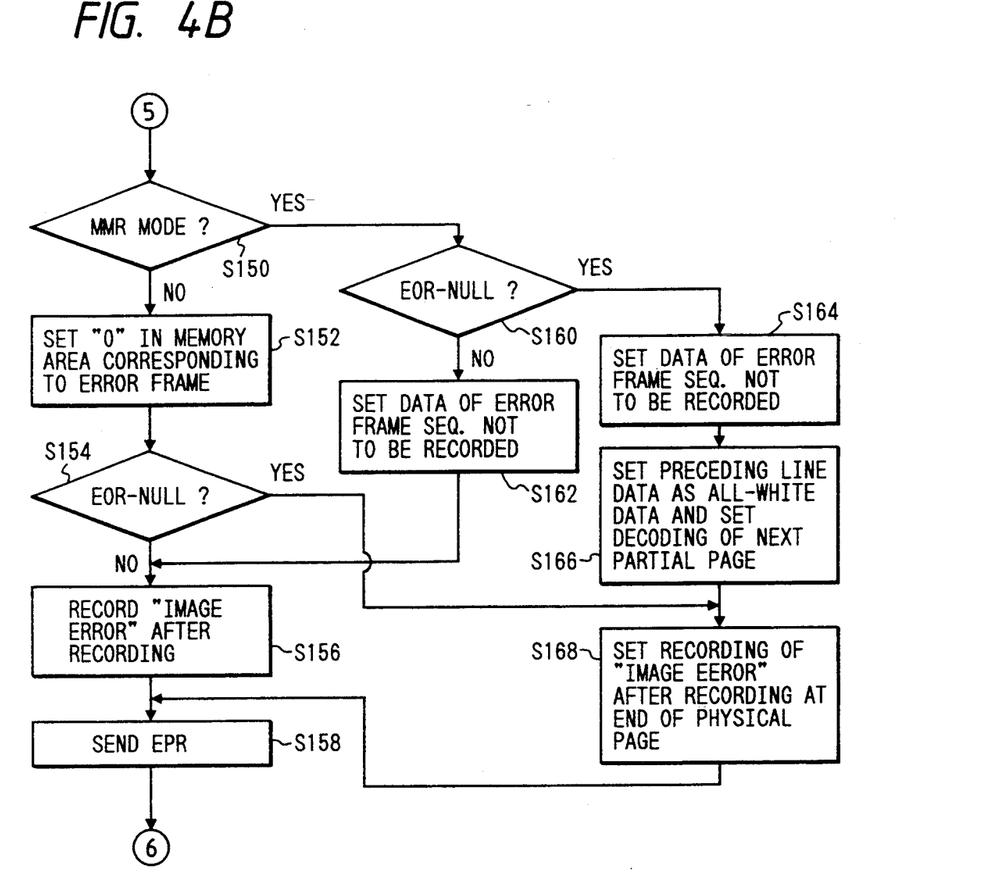

FIGS. 4A and 4B show a flow chart of a reception process routine, which is executed when the reception is detected in the step S50 of FIG. 2. The reception process is explained below.

In the reception process, a signal of a signal level "1" is supplied to the signal line 38a to turn on the CML in a step S118. In a step S120, a pre-protocol is executed. In the pre-protocol, it is informed to the destination station by the NSF signal that the reception of the data produced by encoding the first encoded line of the next partial page of the same physical page with reference to the all-white line is permitted when the block error resend of the partial page which is not the physical page is given up in the MMR transmission of the ECM.

In a step S122, whether it is the ECM reception mode or the normal G3 reception mode is determined. If it is the normal G3 reception mode, the process proceeds to a step S124 to receive an image in the normal G3 mode, the post-protocol is executed in a step S126, and the CML relay is turned off in a step S127 to terminate the reception process. If it is in the ECM reception mode, the process proceeds from the step S122 to a step S128 to receive the image data in the ECM mode. When one block of data has been received, the intermediate protocol is executed in a step S130. In a step S132, whether an error frame is included in the received one-block data or not is determined, and if the error frame is included, the PPR signal which designates the error frame is sent in a step S142 to inform the error frame to the destination station. If no error frame is included, the process proceeds from the step S132 to a step S134.

In the step S134, whether it is the boundary of the physical page or not is determined. If it is the boundary, the process proceeds to a step S128, and if it is not the boundary, the process proceeds to a step S136.

In the step S136, whether the next page is present or not is determined, and if the next page is not present, the process proceeds to a step S127. If the next page is present, the process proceeds to a step S138.

In the step S138, whether the mode change is included or not is determined. If the mode change is included, the process proceeds to a step S140 to execute the intermediate protocol, and if the mode change is not included, the process proceeds to a step S128 to receive the image data of the next page (next block).

When the error frame is included and the PPR is received in the step S142 and the process proceeds to a step S144, whether the image signal has been detected or not, specifically whether a high speed flag has been detected or not is determined. If the image signal has been detected, the process proceeds to a step S128, and if the image signal has not been detected, the process proceeds to a step S146.

In the step S146, whether a CTC signal has been received or not is determined. If the CTC signal has been detected, a transmission rate designated by the CTC signal is set and a CTR signal is sent in a step S148. If the CTC signal has not been detected, that is, when the EOR-Q signal is detected, the process proceeds to a step S150.

In the step S150, whether it is the MMR mode or not is determined. When it is the MMR mode, the process proceeds to a step S160, and when it is not the MMR mode, the process proceeds to a step S152.

In the step S152, "O's" are set in a memory space corresponding to the error frame. In a step S154, whether the EOR-NULL signal has been received or not is determined. If the EOR-NULL signal has been received, the process proceeds to a step S168, and if the EOR-MPS, EOR-EOM or EOR-EOP signal has been received, the process proceeds to a step S156.

In the step S156, an error message such as "Image error included" is recorded after recording. In a step S158, the ERR signal is sent. When the process proceeds from the step S150 to a step S160, whether the EOR-NULL signal has been received or not is determined. If the EOR-NULL signal has been received, the process proceeds to a step S164, and if the EOR-MPS, EOR-EOM or EOR-EOP signal has been received, the process proceeds to a step S162.

In a step S162, setting is made not to record the data following to the error frame because the frames following to the error frame cannot be correctly recorded.

When the process proceeds from the step S160 to the step S164, setting is made not to record the data following to the error frame. In a step S166, setting is made to render the data of the previous line all-white and the next partial page is decoded.

In a step S168, setting is made to record an error message such as "Image error included" after recording of the boundary of the physical page, and the process proceeds to a step S158.

In the present embodiment, when the block error resend of the partial page which is not the physical page is given up in the ECM communication in the MMR mode, the first coded line of the next partial page of the same physical page is encoded with reference to the all-white line. Instead of encoding with reference to the all-white line, the first line may be MH-encoded.

In accordance with the present embodiment, the wasteful transmission is prevented in the transmission of the image in the error resend mode and efficient image transmission is attained.

The present invention is not limited to the above embodiments but various modifications thereof may be made.

What is claimed is:

1. A facsimile apparatus for communicating image data, said apparatus having a plurality of modes for encoding image data to be transmitted and comprising:
   selection means for selecting one of a plurality of encoding modes, wherein a first one of the encoding modes is an at least two-dimensional encoding mode;
   encoding means for encoding image data by employing the selected encoding mode;
   retransmission means for retransmitting encoded image data in accordance with a request of retransmission from a receiver station; and
   control means for controlling transmission of next image data that follows first image data encoded and transmitted by said apparatus, said control means being operative, in response to the first encoding mode being selected for encoding the first image data and the encoded first image data being not correctly transmitted after retransmission of the encoded first image data a predetermined number of times, for controlling whether the next image data is to be transmitted as encoded image data encoded using the first encoding mode.

2. A facsimile apparatus according to claim 1, wherein said control means distinguishes whether the next image data is remaining data of one physical page of image data when the one physical page of image data has a transmission error, and controls the transmission of the next image data with regard to a distinguished result and the selected encoding mode employed by said encoding means.

3. A facsimile apparatus according to claim 2, wherein said control means inhibits the transmission of the next image data when the selected encoding mode employed by said encoding means is the first encoding mode and the next image data is the remaining data of the one physical page having a transmission error.

4. A facsimile apparatus according to claim 2, wherein said control means enables the transmission of the next image data without regard to the selected encoding mode when the next image data is the data of another physical page following the page having a transmission error.

5. A facsimile apparatus according to claim 1, wherein said control means enables the transmission of the next image data when the selected encoding mode employed by said encoding means is not an at least two dimensional encoding mode.

6. A facsimile apparatus according to claim 2, wherein said control means converts the next image data to prevent propagation of an error before the transmission, when the first image data is encoded by the first encoding mode and the next image data is remaining data of the one physical page having a transmission error.

7. A facsimile apparatus for communicating image data, said apparatus having a plurality of modes for encoding image data to be transmitted and comprising:
   selection means for selecting one of a plurality of encoding modes;
   encoding means for encoding image data by employing the selected encoding mode; and
   control means for controlling transmission of next image data that follows and is remaining data of one physical page with, first image data having a transmission error, said control means controlling the transmission of the next image data with regard to the selected encoding mode employed by said encoding means when the encoded first image data is not correctly transmitted after retransmission of error data a predetermined number of times so that said one physical page has a transmission error.

8. A facsimile apparatus according to claim 7, wherein said control means inhibits the transmission of the next image data when the selected encoding mode employed by said encoding means is an at least two-dimensional encoding mode and the next image data is remaining data of said one physical page having a transmission error.

9. A facsimile apparatus according to claim 7, wherein said control means transmits the next image data without regard to the encoding mode when the next image data is the data of another physical page following said one physical page having a transmission error.

10. A facsimile apparatus according to claim 7, wherein said control means transmits the next image data when the selected encoding mode employed by said encoding means is not an at least two-dimensional encoding mode.

11. A facsimile apparatus according to claim 7, wherein said control means converts the next image data to prevent propagation of an error before the transmission when the first image data is encoded by an at least two-dimensional encoding mode and the next image data is remaining data of said one physical page having a transmission error.

12. A method for communicating image data, said method having a plurality of modes for encoding image data to be transmitted and comprising the steps of:
   selecting one of a plurality of encoding modes, wherein a first one of the encoding modes is an at least two-dimensional encoding mode;
   encoding image data by employing the selected encoding mode;
   retransmitting image data in accordance with a request of retransmission from a receiver station; and
   controlling transmission of next image data that follows first image data encoded and transmitted by said method, said controlling step being operative, in response to the first encoding mode being selected for encoding the first image data and the encoded first image data being not correctly transmitted after retransmission of the encoded first image data a predetermined number of times, for controlling whether the next image data is to be transmitted as encoded image data encoded using the first encoding mode.

13. A method for communicating image data according to claim 12, wherein the next image data is transmitted when the selected encoding mode employed in said encoding step is not an at least two-dimensional encoding system.

14. A method for communicating image data according to claim 12, wherein whether the next image data is remaining data of one physical page having a transmission error or not is distinguished when the selected encoding mode is an at least two-dimensional encoding mode, and the transmission of the next image data is controlled in accordance with a distinguished result.

15. A method for communicating image data according to claim 14, wherein the next image data is not transmitted when the next image data is remaining data of said one physical page having a transmission error.

16. A method for communicating image data according to claim 14, wherein the next image data is converted to prevent propagation of error before the transmission when the next image data is remaining data of said one physical page having a transmission error.

17. A facsimile apparatus for communicating image data by an error retransmission communication that divides image data of one physical page into plural units of image data and transmits the units sequentially when a data amount of one page exceeds a predetermined data amount, said apparatus comprising:
    encoding means for encoding image data by an MMR encoding method;
    retransmission means for retransmitting encoded image data in accordance with a request of retransmission from a receiver station; and
    control means for controlling transmission of next image data of a physical page following first image data of the physical page having a transmission error when the first image data is not correctly transmitted after retransmission of error data a predetermined number of times.

18. A facsimile apparatus according to claim 17, wherein said control means inhibits the transmission of the next image data, when the next image data is remaining data of said one physical page having a transmission error.

19. A method for communicating image data, said method transmitting image data encoded by a selected one of a plurality of encoding methods and comprising the steps of:
    selecting one of the plurality of encoding methods;
    retransmitting encoded image data in accordance with a request of retransmission from a receiver station; and
    controlling transmission of next image data in accordance with the selected encoding method when a transmission error is not removed after retransmission of error data a predetermined number of times,
    wherein in said controlling step, it is distinguished whether the next image data is remaining data of one physical page having a transmission error or not when the one physical page of image data has a transmission error.

20. A method for communicating image data according to claim 19, wherein in said controlling step, the transmission of the next image data is inhibited when the selected encoding method discriminated in said discriminating step is a two-dimensional encoding method and the next image data is remaining data of said one physical page having a transmission error.

21. A method for communicating image data according to claim 19 wherein in said controlling step, the next image data without regarding to the encoding method of the image data is transmitted when the next image data is the data of another physical page following said one physical page having a transmission error.

22. A method for communicating image data according to claim 19 wherein in said controlling step the next image data is transmitted when the selected encoding method discriminated in said discriminating step is not a two-dimensional encoding method.

23. A method for communicating image data according to claim 19 wherein in said controlling step, the next image data is converted to prevent propagation of an error before the transmission when the image data is encoded by a two-dimensional encoding method and the next image data is remaining data of said one physical page having a transmission error.

24. A facsimile apparatus for communicating image data, said apparatus selecting one of the plurality of encoding modes and comprising:
    encoding means for encoding image data in accordance with the selected encoding mode;
    retransmission means for retransmitting encoded image data in accordance with a request of retransmission from a receiver station;
    discrimination means for discriminating the selected encoding mode; and
    control means for stopping the transmission of the MMR encoded image data when the encoding mode discriminated by said discrimination means is MMR encoding mode, and the encoded image data is not correctly transmitted and after retransmission of the encoded image data a predetermined number of times.

* * * * *

UNITED STATES PATENT AND TRADEMARK OFFICE
CERTIFICATE OF CORRECTION

PATENT NO. : 5,438,427
DATED : August 1, 1995
INVENTOR(S) : TAKEHIRO YOSHIDA

It is certified that error appears in the above-identified patent and that said Letters Patent is hereby corrected as shown below:

COLUMN 1

Line 27, "an affect by the" should read --the effect of--.

COLUMN 4

Line 19, "retransmission)-Q." should read
--retransmission)-Q--.

COLUMN 12

Line 16, "claim 19" should read --claim 19,--.
Line 22, "claim 19" should read --claim 19,--.
Line 27, "claim 19" should read --claim 19,--.
Line 47, "and" should be deleted.

Signed and Sealed this

Fourteenth Day of November, 1995

Attest:

BRUCE LEHMAN

Attesting Officer    Commissioner of Patents and Trademarks